US011291522B2

(12) United States Patent
Monty et al.

(10) Patent No.: US 11,291,522 B2
(45) Date of Patent: Apr. 5, 2022

(54) SYSTEMS AND METHODS TO CONTROL DEPTH OF TREATMENT IN DENTAL LASER SYSTEMS

(71) Applicant: Convergent Dental, Inc., Natick, MA (US)

(72) Inventors: Nathan P. Monty, Shrewsbury, MA (US); Charles H. Dresser, Bethel, ME (US)

(73) Assignee: Convergent Dental, Inc., Needham, MA (US)

( * ) Notice: Subject to any disclaimer, the term of this patent is extended or adjusted under 35 U.S.C. 154(b) by 0 days.

(21) Appl. No.: 14/952,329

(22) Filed: Nov. 25, 2015

(65) Prior Publication Data

US 2016/0143703 A1 May 26, 2016

Related U.S. Application Data

(60) Provisional application No. 62/084,783, filed on Nov. 26, 2014.

(51) Int. Cl.
*A61C 1/00* (2006.01)
(52) U.S. Cl.
CPC .......... *A61C 1/0046* (2013.01); *A61C 1/0015* (2013.01)
(58) Field of Classification Search
CPC .................................................. A61C 1/0046
See application file for complete search history.

(56) References Cited

U.S. PATENT DOCUMENTS

| 3,865,113 A * | 2/1975 | Sharon | B23K 26/02 |
| | | | 606/18 |
| 4,638,800 A * | 1/1987 | Michel | A61B 18/201 |
| | | | 606/10 |
| 5,112,328 A * | 5/1992 | Taboada | B23K 26/146 |
| | | | 128/898 |
| 5,207,673 A * | 5/1993 | Ebling | A61B 18/24 |
| | | | 385/33 |
| 5,388,987 A | 2/1995 | Badoz et al. | |
| 5,558,666 A | 9/1996 | Dewey et al. | |
| 5,632,741 A * | 5/1997 | Zavislan | A61B 18/203 |
| | | | 606/9 |

(Continued)

FOREIGN PATENT DOCUMENTS

| CN | 100470966 C | 3/2009 |
| WO | WO-1999055243 A1 | 11/1999 |
| WO | WO-2012105972 A1 | 8/2012 |

OTHER PUBLICATIONS

Assa, et al., "Ablation of Dental Hard Tissues with a Microsecond Pulsed Carbon Dioxide Laser Operating at 9.3-μm with an Integrated Scanner," Proc. SPIE Int Soc Opt Eng. (2008), 16 pages.

(Continued)

*Primary Examiner* — Lynsey C Eiseman
(74) *Attorney, Agent, or Firm* — Goodwin Procter LLP (57) ABSTRACT

A dental laser treatment system may include a laser source providing a laser beam, and a focusing device to produce a laser beam having a waist. The focal length and waist of the laser beam are selected to achieve a depth of treatment that is at least 5 mm long, and has a power density of at least a minimum power density required to perform a selected treatment on dental tissue. In some instances, the focal length is 25 mm or greater.

18 Claims, 8 Drawing Sheets

(56) References Cited

U.S. PATENT DOCUMENTS

| | | | |
|---|---|---|---|
| 5,688,262 | A | 11/1997 | Abraham |
| 5,738,678 | A * | 4/1998 | Patel ............... A61C 1/0046 433/215 |
| 5,743,902 | A * | 4/1998 | Trost ............... A61B 18/203 606/11 |
| 6,086,366 | A * | 7/2000 | Mueller ............ A61C 1/0046 433/29 |
| 6,451,010 | B1 | 9/2002 | Angeley |
| 6,548,876 | B2 | 4/2003 | Ju |
| 6,676,654 | B1 | 1/2004 | Balle-Petersen et al. |
| 7,931,645 | B2 | 4/2011 | Strassl et al. |
| 7,951,139 | B2 | 5/2011 | Assa et al. |
| 8,011,923 | B2 | 9/2011 | Lukac et al. |
| 2001/0001118 | A1 | 5/2001 | Asah et al. |
| 2003/0158544 | A1* | 8/2003 | Slatkine ........... A61C 1/0046 606/10 |
| 2006/0127861 | A1* | 6/2006 | Villoresi .......... A61C 1/0046 433/215 |
| 2007/0014517 | A1* | 1/2007 | Rizoiu ............. A61B 18/22 385/45 |
| 2009/0186318 | A1 | 7/2009 | Assa et al. |
| 2009/0187175 | A1* | 7/2009 | Assa ................ A61B 18/22 606/16 |
| 2010/0015576 | A1* | 1/2010 | Altshuler ......... A61B 5/0066 433/218 |
| 2011/0118713 | A1* | 5/2011 | Raksi .............. A61F 9/00825 606/6 |
| 2011/0189628 | A1* | 8/2011 | Monty ............. H01S 3/03 433/29 |
| 2011/0251603 | A1 | 10/2011 | Temelkuran et al. |
| 2011/0300504 | A1 | 12/2011 | Kasenbacher |
| 2012/0316544 | A1* | 12/2012 | Horvath .......... A61F 9/00825 606/6 |
| 2013/0059264 | A1 | 3/2013 | Monty |
| 2014/0263214 | A1* | 9/2014 | Dahotre ........... A61B 18/203 219/121.69 |
| 2014/0316388 | A1* | 10/2014 | Hipsley ........... A61F 9/00802 606/4 |
| 2015/0223911 | A1* | 8/2015 | Lukac .............. A61C 1/0069 433/29 |
| 2015/0327930 | A1* | 11/2015 | Bruno .............. A61B 5/0066 600/427 |

OTHER PUBLICATIONS

Can, et al., "Non-Destructive Assessment of Inhibition of Demineralization in Dental Enamel Irradiated by a λ A = 9.3-μm CO2 Laser at Ablative Irradiation Intensities with PS-OCT," Laser in Surgery and Medicine, vol. 40, (2008), 8 pages.

Carvlho, et al., "Influence of Er:YAG Laser Beam Angle, Working Distance, and Energy Density on Dentin Morphology: An SEM Investigation," Journal of Oral Laser Applications, vol. 5, No. 4 (2005), 7 pages.

Chan, et al., "Selective Removal of Demineralization Using Near Infrared Cross Polarization Reflectance and a Carbon Dioxide Laser," SPIE, vol. 8208, (2012), 12 pages.

Cheng, et al., "Use of a Compact Fiber Optic Spectrometer for Spectral Feedback during the Laser Ablation of Dental Hard Tissues and Restorative Materials," SPIE, vol. 6137, (2006), 7 pages.

Coherent, "Lasers for Medical CO2/Excimer/Semiconductor Diodes/OPSL/Fiber Components," (2015), 12 pages.

Configuration of optics Putting the laser shop on line, download from https://laseroflove.files.wordpress.com/2010/03/cutting.png, (2010), 4 pages.

Emigh, "Experimental Evaluation of Bone Drilling Using Ultrashort Pulsed Laser Ablation," A Thesis to McMaster University, (2011), 131 pages.

Fan, et al., "A High Repetition Rate Tea CO2 Laser Operating at λ = 9.3-μm for the Rapid and Conservative Ablation and Modification of Dental Hard Tissues," Proc. of SPIE, vol. 6137, (2006), 9 pages.

Featherstone, et al., "Effect of Pulse Duration and Repetition Rate on CO2 Laser Inhibition of Caries Progression," SPIE, vol. 2672, (1996), 9 pages.

Featherstone, "Lasers in de tandheelkunde 3," Ned TijdschrTandheelkd, vol. 109, (2002), 6 pages.

Featherstone, et al., "CO2 Laser Inhibition of Artificial Caries-like Lesion Progression in Dental Enamel," J Dent Res 77(6) , (Jun. 1998), pp. 1397-1403.

Featherstone, et al., "Mechanism of Laser Induced Solubility Reduction of Dental Enamel," SPIE, vol. 2973, (1997), 5 pages.

Featherstone, et al., "Rational Choice of laser conditions for inhibition of caries progression," SPIE, vol. 2394, (1995), 11 pages.

Featherstone, et al., "Surface dissolution kinetics of dental hard tissue irradiated over a fluence range of 1-8 J/cm2," SPIE, vol. 3248, (1998), 6 pages.

Fried, et al., "Dissolution Studies of Bovine Dental Enamel Surfaces Modified by High-Speed Scanning Ablation with a λ = 9.3-μ.m TEA CO2 Laser," Laser in Surgery and Medicine, vol. 38, (2006), 9 pages.

Fried, et al., "Infrared Spectroscopy of Laser Irradiated Dental Hard Tissues Using the Advanced Light Source," SPIE, vol. 4249, (2001), 5 pages.

Fried, et al., "IR laser ablation of dental enamel: mechanistic dependence on the primary absorber," Applied Surface Science, vol. 127, (1998), 5 pages.

Fried, et al., "Multiple pulse irradiation of dental hard tissues at CO2 laser wavelengths," SPIE vol. 2394, (1995), 10 pages.

Fried, et al., "Permanent and Transient Changes in the Reflectance of CO2 Laser-Irradiated Dental Hard Tissues at λ = 9.3, 9.6, 10.3, and 10.6 μm and at Fluences of 1-20 J/cm2," Lasers in Surgery and Medicine, vol. 20, (1997), 10 pages.

Fried, et al., "The thermal effects on CO2 laser irradiated dental enamel at 9.3, 9.6, 10.3, and 10.6 μm.," SPIE, vol. 2128, (1994), 11 pages.

Fried, et al., "Thermal and chemical modification of dentin by pulsed CO2 laser irradiation at 9-11 μm," SPIE, vol. 2973, (1997), 8 pages.

Fried, et al., "Thermal response of hard dental tissues to 9-through 11-μm CO2-laser irradiation," Optical Engineering, vol. 35, (1996), 9 pages.

Habelitz, et al., "Nanomechanical Properties of Dentin Treated with a CO2 Laser for Potential Caries Inhibition," SPIE, vol. 6843, (2008), 8 pages.

Hedayatollahnajafi, et al., "Dentin bond strength after ablation using a CO2 laser operating at high pulse repetition rates," SPIE, (2009), 14 pages.

Homburg, et al., "Refractive microlens structures with high-damage thresholds enable flexible beam shaping of high-power lasers," SPIE, vol. 6403, 8 pages.

International Search Report and Written Opinion for International Patent Application No. PCT/US2015/062737 dated Mar. 10, 2016 (13 pages).

II-VI Infrared Tutorials: Spot Size, download from http://www.iiviinfrared.com/resources/spot, on Apr. 5, 2016, 4 pages.

Kuranov, et al., "In vivo depth-resolved oxygen saturation by dual-wavelength photothermal (DWP) OCT," Optics Express, vol. 19, (2011), 14 pages.

Le, et al., "Lack of Dentin Acid Resistance Following 9.3 μm CO2 Laser Irradiation," SPIE, vol. 6843, (2008), 5 pages.

Lumenis, "CO2 Laser Accessories," Lumenis Enhancing Life Advancing Technology, (2008), 24 pages.

Matsumoto, "Laser Treatment of Hard Tissue Lesions," Journal Oral Laser Application, vol. 4, (2004). 14 pages.

Maung, et al., "Near-IR Imaging of Thermal Changes in Enamel during Laser Ablation," SPIE, vol. 5, (2010), 13 pages.

McCormack, et al., Scanning Electron Microscope Observations of CO2 Laser Effects on Dental Enamel, J Dent Res, vol. 74, (1995), 7 pages.

Meister, et al., "Influence of the spatial beam profile on hard tissue ablation, Part II: pulse energy and energy density distribution in simple beams," Lasers in Medical Science, (2004), 7 pages.

NASA, "Repetitively Pulsed, Wavelength-Selective CO2 Laser," Tech Brief No. 68-10564, (1969), 1 page.

(56) References Cited

OTHER PUBLICATIONS

Nguyen, et al., "High-speed scanning ablation of dental hard tissues with a λ = 9.3 μm CO2 laser: adhesion, mechanical strength, heat accumulation, and peripheral thermal damage," Journal of Biomedical Optics, SPIE, vol. 16. (2011), 10 pages.

Ossoff, et al., "Basic Principles and Safety Considerations," Laser Surgery, Chapter 12, (2011), 18 pages.

Rode, et al., "Precision ablation of dental enamel using a subpicosecond pulsed laser," Australian Dental Journal, vol. 48, (2003), 7 pages.

Rodrigues, et al., "Carbon dioxide laser in dental caries prevention," Journal of Dentistry, vol. 32, (2004), 10 pages.

Rosa, et al., "Analysis of Peripheral Thermal Damage after Laser Irradiation of Dentin using Polarized Light Microscopy and Synchrotron Radiation Infrared Spectromicroscopy," SPIE, vol. 5313, (2004), 10 pages.

Schoenly, et al., "Laser Ablation of Dental Calculus at 400 nm Using a Ti:Sapphire Laser," University of Rochester Laboratory for Laser Energetics, (Jan. 2009), 19 pages.

Solea, Convergent Dental download from http://www.convergentdental.com/solea/, on Apr. 5, 2016, 7 pages.

Solea, Dental Products & Reviews, downloaded from http://dentalproducts.dentalproductsreport.eom/s/dental-lasers/products/solea/, on Apr. 5, 2016, 3 pages.

Staninec, et al., "Pulpal Effects of Enamel Ablation with a Microsecond Pulsed λ=9.3-μm CO2 Laser," Lasers Surgery and Medicine, vol. 41, (2009), 17 pages.

Takahashi, et al., "Morphological and Atomic Analytical Changes after CO2 Laser Irradiation Emitted at 9.3 μm on Human Dental Hard Tissues," Journal of Clinical Laser Medicine & Surgery, vol. 16. (1998), 8 pages.

Viraparia, et al., "CO2 Laser: Evidence Based Applications in Dentistry," Optimisation and Application, Dr. Dan C. Dumitras (Ed.), ISBN: 978-953-51-0351-6, InTech, Available from: http://www.intechopen.com/books/co2-laser-optimisation-and-application/co2-laserevidence-based-applications-in-dentistry, (2012), 9 pages.

Werner, et al., "Ablation of hard biological tissue and osteotomy with pulsed CO2 lasers," Institute of Laser Medicine of the Heinrich-Heine University Dusseldorf, (2006), 154 pages.

Wigdor, et al., "The Effect of the CO2 laser(9.6μm) on the Dental Pulp in Humans." SPIE, vol. 3910, (2000), 6 pages.

Wilder-Smith, et al., "Incision properties and thermal effects of three CO2 lasers in soft tissue," Oral Surgery Oral Medicine Oral Pathology, vol. 79, (1995), 7 pages.

Zhang, et al., "CO2 laser power delivery using TeX glass fiber," SPIE, vol. 2328, (2016), 7 pages.

Zuerlein, et al., "Absorption coefficients of dental enamel in the infrared: a solution to a seemingly straightforward problem," SPIE, vol. 3248, (2006), 9 pages.

Zuerlein, et al., Modeling thermal emission in dental enamel induced by 9-11 μm laser light, Applied Surface Science, vol. 127, (1998), 6 pages.

Zuerlein, et al., "Optical Properties of Dental Enamel at 9-11 μm Derived from Time-Resolved Radiometry," SPIE, vol. 2973, (1997), 8 pages.

Gerold K.H. Eyrich, "Laser-osteotomy induced changes in bone", Medical Laser Application 20 (2005) 25-36.

M. Frentzen, et al., "Osteotomy with 80μs CO2 laser pulses—histological results", Lasers Med Sci (2003)18:119-124.

Werner, et al., "CO2 laser free-form processing of hard tissue", Therapeutic Laser Applications and Laser-Tissue Interactions III, Feb. 24, 2010 Vol. 6632 663202-1-6632 663202-6.

Ivanenko, et al., "Ablation of hard bone tissue with puled CO2 Lasers", Medical Laser Application 20 (2005) 13-23.

G. D. Rajitha Gunaratne, Riaz Khan, Daniel Fick, Brett Robertson, Narendra Dahotre & Charlie Ironside (2016): A review of the physiological and histological effects of laser osteotomy, Journal of Medical Engineering & Technology, DOI: 10.1080/03091902.2016.1199743 (published online Jun. 27, 2016).

Ivanenko, et al., "Hard tissue ablation with sub-μs CO2 laser pulses with the use of air-water spray", Optical Biopsy and Tissue Optics, Proceedings of SPIE vol. 4161 (2000).

Ivanenko, et al., "In Vivo animal trials with a scanning CO2 laser Osteotome," Lasers in Surgery and Medicine 37:144-148 (2005).

Ivanenko, et al., "System development and clinical studies with a scanning CO2 laser osteotome," Optical Interactions with Tissue and Cells XVII, Proc, of SPIE vol. 6084, 60840H, (2006) 1605-7422.

Kahrs, et al., "Planning and simulation of microsugrical laser bone ablation," Int J CARS (2010) 5:155-162 (DOI 10.1007/s11548-009-0303-4).

Kuttenberger, et al., "Bone healing of the sheep tibia shaft after carbon dioxide laser osteotomy; histological results," Lasers Med Sci (2010) 25:239-249 (DOI 10.1007/s10103-009-0714-z).

Nair, et al., "Observations on pulpal response to carbon dioxide laser drilling of dentine in healthy human third molars," Lasers in Medical Science (2005) 19: 240-247 (DOI 10.1007/s10103-004-0317-7).

Werner, et al., "CO2 laser "milling" of hard tissue" Optical Interactions with Tissue and Cells XVIII, Proc. of SPIE vol. 6435, 64350E, (2007) 1605-7422.

Kuttenberger, et al., "Computer-Guided CO2-laser osteotomy of the SheepTibia: Technical prerequisites and first resultes," Photomedicine and Laser Surgery, vol. 26, No. 2, 2008, pp. 129-136 (DOI: 10.1089/pho.2007.2139).

Ertl, et al., "Hard Tissue Ablation With Pulsed CO2 Lasers", SPIE vol. 1800 pp. 176-181 (Downloaded From: http://proceedings.spiedigitallibrary.org/ on Jun. 2, 2015).

Zhang, et al., "Optimization of Line Cut Strategy for Bone tissue ablation using Short-pulsed CO2 laser based on thermal relaxation," (Karlsruhe Institute of Technology (KIT), Institute for Process Control and Robotics (IPR), Karlsruhe, Germany, 2010).

\* cited by examiner

| Parameter | Min | Nominal | Max | Unit |
|---|---|---|---|---|
| Focal Length | 25 | 135 | 200 | mm |
| Waist Diameter | 50 | 250 | 500 | µm |
| Spot Size | 50 | 400 | 1000 | µm |
| Taper Angle Relative to Normal to Treatment Surface | 7 | 1.25 | 0.75 | deg |
| Depth of Treatment Distance About Waist | 5 | 25 | 50 | mm |
| Distance of Surface to Be Treated from Handpiece Tip | 0 | 10 | 50 | mm |
| Fluence at Waist | 10 | 20 | 50 | J/cm2 |
| Fluence at End of Treatment Distance | 5 | 10 | 20 | J/cm2 |
| Laser Beam Profile | Gaussian | Top Hat | Donut | - |
| Laser Beam Wavelength | 9 | 9.3 | 12 | µm |
| Pulse Cycle (i.e., ON and OFF Durations of Pulse) | 30 | 1000 | 20000 | µs |
| Pulse Width (i.e., ON Duration of Pulse) | 5 | 50 | 300 | µs |
| Duty Cycle | 1 | 10 | 50 | % |
| Incident Beam Diameter | 0.02 | 0.12 | 8 | mm |

| Coolant Flow = 13ml/min | Repetition Rate = 30Hz | Waist = 200μm | Enamel Thickness = 2mm |
|---|---|---|---|
| Pulse Width (us) | Energy Per Pulse(mJ) | Fluence at Waist (J/cm$^2$) | Temp Rise Over 20 Seconds (°C) |
| 25 | 6.8 | 21.6 | 0 |
| 50 | 15.8 | 50.3 | 0.1 |
| 100 | 33 | 105 | 0.4 |
| 200 | 63 | 201 | 0.8 |
| 300 | 88 | 280 | 1.1 |
| 400 | 111 | 353 | 1.8 |
| 500 | 131 | 417 | 2.1 |

FIGURE 8

SYSTEMS AND METHODS TO CONTROL DEPTH OF TREATMENT IN DENTAL LASER SYSTEMS

CROSS-REFERENCE TO RELATED APPLICATIONS

This application claims the benefit of priority to U.S. Provisional Patent Application No. 62/084,783, entitled "Systems and Methods to Control Depth of Treatment in Dental Laser Systems," filed Nov. 26, 2014, the disclosure of which is incorporated herein by reference in its entirety.

FIELD OF THE INVENTION

The present disclosure relates generally to a laser-based dental laser treatment system and, more specifically, to a system in which one or more laser parameters and/or one or more system parameters are controlled so as to provide an increased depth of treatment capability.

BACKGROUND

Lasers are increasingly being shown to be useful in a multitude of hard and soft tissue dental procedures, including removing decay, cutting, drilling or shaping hard tissue, and removing or cutting soft tissue. A tooth has three layers. The outermost layer is the enamel which is the hardest and forms a protective layer for the rest of the tooth. The middle and bulk of the tooth includes dentin, and the innermost layer includes pulp. Enamel includes roughly at least 70% mineral by weight, which generally includes carbonated hydroxyapatite. The enamel and dentin are similar in composition, with dentin having significantly less hydroxyapatite. The pulp includes vessels and nerves. Lasers of a wavelength in the 9.3-9.6 micrometer range are well absorbed by the hydroxyapatite that forms a significant portion of tooth and bone, making these lasers efficient in the removal of hard dental tissue.

Lasers have also been found to be useful in the removal of dental material without needing a local anesthetic that is required when a similar procedure is performed using a drill. Further, lasers generally do not make the noises and vibrations that are associated with dental drills. At least for these reasons, it is the hope of many in the dental industry that lasers may replace the drill, and remove, or at least lessen, the anxiety and fear from dental treatment.

In several dental laser systems, the laser is housed in a console and transmitted to a handpiece through an articulated or flexible arm, via an optical system for beam delivery which may include mirrors, lenses and fiber optic cables. The arm generally attaches to a handpiece/main chamber assembly. For the ease of cleaning and servicing, the handpiece can be detachable. Differently configured detachable handpieces may be used for different dental procedures. Within an end portion of the arm or within the handpiece/main chamber assembly, there is generally a beam guidance system which may be used to precisely guide the laser beam out of the end or beam exit of the handpiece/main chamber assembly and to a treatment area. Generally, the handpiece/main chamber assembly beam exit is small for improved ergonomics and easier manipulation within a person's mouth, and the laser beam path typically passes approximately through the center of the beam exit. The beam guidance system generally includes a pair of galvanometers (e.g., galvo or servo-controlled rotatable mirrors), which can be relatively small and inexpensive.

In order to ablate dental tissue, the laser must provide sufficient energy density at the treatment surface. Energy density may be referred to as fluence, which may be expressed in units of joules per square centimeter ($J/cm^2$). For each specific frequency of radiation, typically there exists a fluence threshold (also called an ablation threshold) for effectively ablating dental tissue, including hard tissue such as enamel and dentin. For example, at 9.3 µm a threshold for surface modification occurs at approximately 2 $J/cm^2$ and a threshold for ablation occurs at approximately 10 $J/cm^2$. If the laser beam is pulsed, the fluence is defined as the energy per pulse divided by the cross-sectional area of the beam at the treatment location (e.g., beam spot size).

Dental laser systems often include one or more focusing elements such as lenses. The focusing element may serve to concentrate the laser beam into a spot of a smaller diameter than the diameter of the beam incident upon the focusing element, so as to increase the fluence ($J/cm^2$) at the laser beam focused spot by reducing the target area upon which the beam impinges. Typically, such a laser beam has an hourglass profile, where the region of minimum diameter and highest fluence is referred to as the waist. The distance from the focusing element to the waist may be called the focal length of the focusing element. From either side of the waist, the laser beam diameter generally diverges and consequently the fluence decreases. In general, a depth of treatment is described as the total distance before, at, and after the waist where the laser beam fluence is equal to or exceeds the material (e.g., tissue) treatment threshold. The treatment threshold may be equal to a tissue ablation threshold for ablative treatments. The depth of treatment for a pulsed laser system can be described as the distance before, at, and after the focused waist diameter, where the energy per pulse per a cross-sectional area of the laser beam exceeds the absorption threshold of the material being treated. Laser beam equations usually call the waist radius $\omega_0$ and thus the waist diameter is $2\omega_0$. In many conventional systems, the laser beam diverges from the waist at an angle so large that the depth of treatment is typically just a few millimeters.

Research performed at University of California San Francisco, by researchers such as Featherston, Fried, and Rechmann, has shown that 9.3 µm and 9.6 µm laser wavelengths are well suited for treatment of dental hard tissue. According to techniques that describe the thermal relaxation time as an indicator of the pulse duration for laser treatment, pulses having a duration in the range of 5 µs to 130 µs may be desirable for ablation. Pulse widths in the range of 5 µs to 20 µs may prevent accumulation of heat and may minimize the risk of pulp damage. The pulp of the tooth may be irreversibly damaged if it undergoes a temperature rise of 5° C. or more.

A relatively small depth of treatment in a dental laser treatment system can limit the distance over which dental tissue can be treated, the options for interproximal treatment, and the user flexibility of the system. Several known laser-based dental treatment techniques suffer from one or more of the following disadvantages: depth of treatment is just a few millimeters, need for overly large focusing elements, overly large laser beam waist, operation at a wavelength that is not efficiently absorbed by dental tissue, and insufficient fluence to treat dental hard tissue.

SUMMARY

In order to facilitate improved treatment, e.g., faster and/or more efficient treatment, various embodiments of a dental laser treatment system described herein provide for a relatively large depth of treatment (e.g., about 5 mm or greater) for treatment of dental tissue (e.g., enamel and dentin) while maintaining a sufficiently high fluence, and minimizing or avoiding damage to the dental tissue that is not to be treated. Providing a larger (e.g., longer) depth of treatment can allow for interproximal cutting of teeth and can simplify the use of the dental laser. For example, with a sufficiently large depth of treatment, small deviations in the distance of the laser beam delivery device from the treatment surface (e.g., the standoff distance between the beam exit of a handpiece and the treatment surface), that may be caused by inadvertent movement of the handpiece or the treatment site (e.g., a patients head/mouth), may have no significant effect (e.g., less than 1%, less than 5%, less than 10%, etc.) on the fluence at the treatment surface.

To this end, one aspect of the present disclosure includes a dental laser treatment system featuring a laser source providing a laser beam and a subsystem focusing element adapted to shape the laser beam to have a waist and to provide a depth of treatment of at least 5 mm, centered about the waist. The laser source may be adapted to provide at the depth of treatment an energy density at least equal to a minimum energy density desired to perform treatment upon hard dental tissue.

In various embodiments, the waist may be in the range of 50 µm to 500 µm. The laser beam may have a wavelength in the range from 9 µm to 12 µm. In some instances, the focusing element is adapted to provide a laser beam having a Gaussian beam profile or a top-hat beam profile. The focusing element may be adapted to form the waist of the laser beam at a focal distance of at least 25 mm (e.g., up to 135 mm). The focusing element may include at least one lens. In certain implementations, the dental laser treatment system may also include a beam guidance system located, for example, between the laser source and the focusing element. The beam guidance system may include at least one galvometer. The dental laser treatment system may also include a handpiece assembly downstream from the focusing element. In some instances, a turning mirror and/or the focusing element may be disposed within the handpiece assembly. In certain cases, the laser source is configured to provide a laser beam having a diameter (e.g., within a range from 0.06 mm up to 5 mm) based at least in part on the waist and a focal length of the focusing element.

In general, in another aspect, embodiments of the disclosure feature a method for performing a laser dental treatment that includes the steps of: providing a laser beam from a laser source; shaping the laser beam using a subsystem focusing element, such that the laser beam has a waist and provides a depth of treatment of at least 5 mm, centered about the waist; and providing at the depth of treatment an energy density at least equal to a minimum energy density required to perform treatment upon hard tissue.

In various embodiments, the waist may be in the range from 50 µm to 500 µm. The laser beam may have a wavelength in the range from 9 µm to 12 µm, and have a Gaussian or top-hat beam profile. In some instances, the shaping step may include using the focusing element (e.g., a lens) to form the waist of the laser beam at a focal distance of at least 25 mm (e.g., up to 135 mm). The method may also include turning a laser beam using a turning mirror disposed within a handpiece assembly. In some instances, the handpiece assembly is disposed downstream from the focusing element. In other instances, the focusing element is disposed within the handpiece assembly. In certain instances, providing the laser beam from the laser source includes adjusting a diameter of the laser beam (e.g., within a range from 0.06 mm up to 5 mm) based at least in part on the waist and a focal length of the focusing element.

In general, in another aspect, embodiments of the disclosure feature a dental laser treatment system that includes a laser source providing a laser beam having a waist, a focus element including at least one lens to provide a focal distance for the laser beam, and a beam guidance system including at least one galvanometer located between the laser source and the focus element. The waist may be in the range of 50 µm to 500 µm and be present at the focal distance. The laser beam may have a wavelength in the range of 9 µm to 10 µm. The laser beam may provide a depth of treatment of at least 5 mm and centered about the waist. In some cases, the depth of treatment has an energy density of at least a minimum energy density required to perform treatment upon dental tissue.

In various embodiments, the laser beam may have a Gaussian or a top-hat beam profile. The dental laser treatment system may further include a handpiece assembly disposed between the focus element and the depth of treatment. In some instances, the dental laser treatment system may also include a turning mirror disposed within the handpiece assembly, for example, between the focus element and the depth of treatment.

In general, in another aspect, embodiments of the disclosure feature a dental laser treatment system that includes a laser source providing a laser beam having a waist and a focal distance, and a depth of treatment centered about the waist. The laser beam may include pulses having a duration greater than 50 µs. The depth of treatment may have an energy density of at least a minimum energy density required to perform treatment upon hard dental tissue. In some cases, the depth of treatment in combination with the focal distance permit laser dental treatment to be performed without the need for standoff distance regulation interdisposed between the dental laser treatment system and the dental tissue.

In various embodiments, the laser beam may have a Gaussian or a top-hat beam profile. The dental laser treatment system may include a system for cooling material within the depth of treatment. The system for cooling material may include fluid (e.g., water or water mist) delivered to the material within the depth of treatment. In some instances, the dental laser treatment system also includes a handpiece assembly, where the fluid is delivered to the material through the handpiece assembly. In some cases, the waist may be in the range of 50 µm to 500 µm. The laser beam may have a wavelength in the range of 9 µm to 12 µm. In certain implementations, the dental laser treatment system includes at least one focus element that provides a focal distance (e.g., at least 25 mm, e.g., up to 135 mm) for the laser beam. In some cases, the waist is present at the focal distance. In certain implementations, the dental laser treatment system also includes a beam guidance system, which may be located between the laser source and the focus element. In some instances, the handpiece assembly may be disposed between the focus element the depth of treatment. The focus element may include at least one lens. The beam guidance system may include at least one galvanometer. In certain implementations, the dental laser treatment system may feature a turning mirror disposed within the handpiece assembly, in which the turning mirror is disposed between the focus element and the depth of treatment.

In general, in another aspect, embodiments of the disclosure feature a dental laser treatment system that includes a laser source providing a laser beam having a waist and a focal distance, a focal element including at least one lens, and a beam guidance system including at least one galvanometer. The waist may be in a range of 50 µm to 500 µm. The laser beam may have a wavelength in a range of 9 µm to 10 µm. In some instances, the laser beam includes pulses having a duration of approximately 50 µs. In some instances, the focal element provides a focal distance for the laser beam, in which the waist is present at the focal distance, and the depth of treatment is centered about the waist. The beam guidance system may be located between the laser source and the focus element. The depth of treatment may have an energy density of at least a minimum energy density required to perform treatment upon dental tissue. In certain implementations, the depth of treatment in combination with the focal distance and/or the pulses permit laser dental treatment to be performed without the need for a standoff distance regulation interdisposed between the dental laser treatment system and the dental tissue.

In various embodiments, the laser beam may have a Gaussian or a top-hat beam profile. The dental laser treatment system may also include a system for cooling material within the depth of treatment. The system for cooling may include fluid (e.g., water or water mist) delivered to the material within the depth of treatment. In some instances, the laser dental treatment system may also include a handpiece assembly, in which fluid is delivered to the material through the handpiece assembly. The handpiece assembly may be disposed between the focus element and the depth of treatment. In some cases, a turning mirror is disposed within the handpiece assembly between the focus element and the depth of treatment.

BRIEF DESCRIPTION OF THE FIGURES

Various aspects this disclosure will become more apparent in view of the attached drawings and accompanying detailed description. The embodiments depicted therein are provided by way of example, not by way of limitation, wherein like reference numerals generally refer to the same or similar elements. In different drawings, the same or similar elements may be referenced using different reference numerals. The drawings are not necessarily to scale, emphasis instead being placed upon illustrating aspects of the invention. In the drawings.

DETAILED DESCRIPTION

Figure 1:
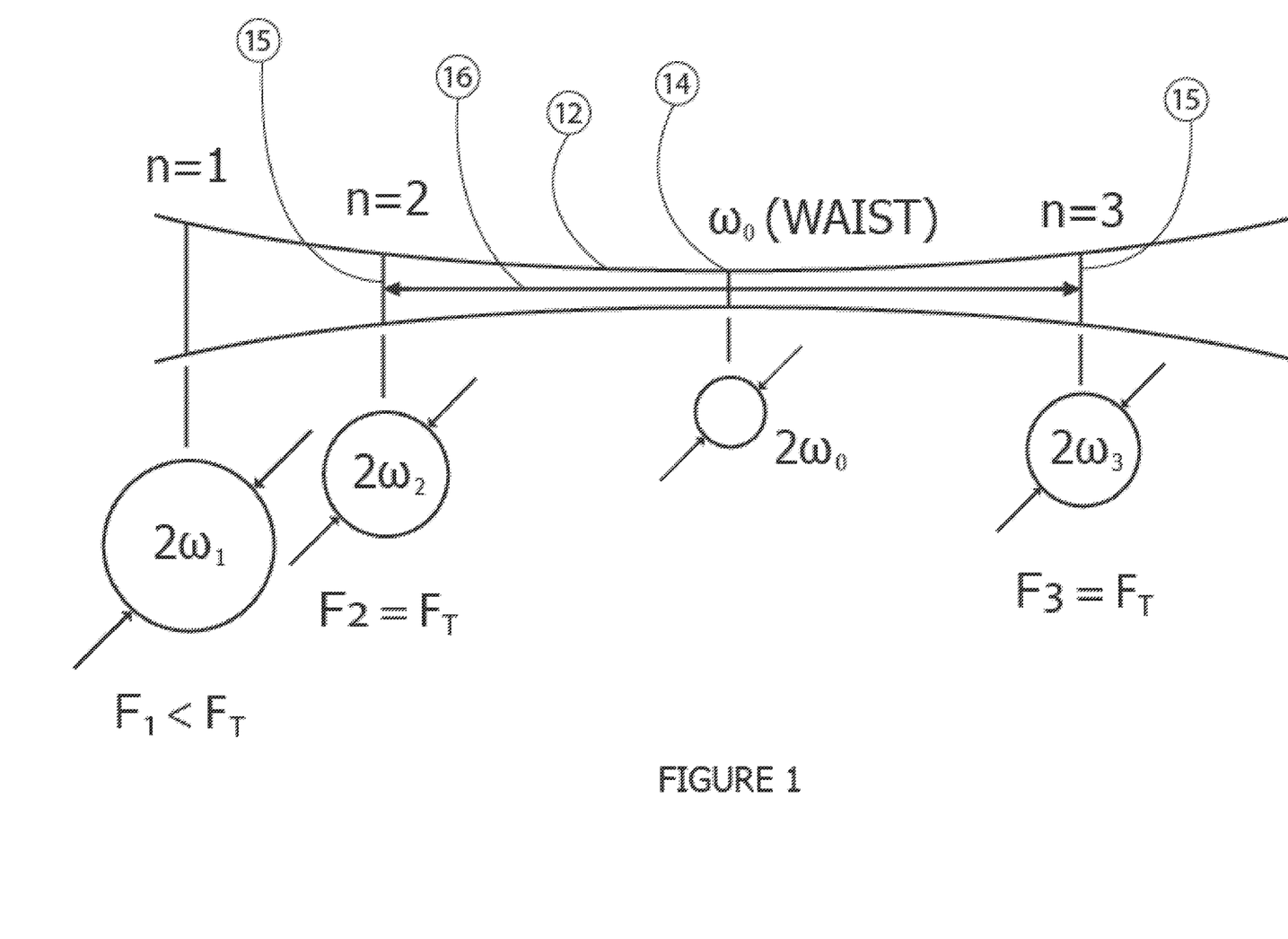
FIG. 1 schematically depicts the waist of a laser beam and depth of treatment regions, according to various embodiments.

FIG. 1 shows a portion of an example laser beam 12 that is generated in various embodiments. The laser beam 12 has a waist 14 having a diameter of $2\omega_0$. The area of the waist 14 is $A_0$, where $A_0=\pi\omega_0^2$, and the area at a point n along the laser beam 12 is $A_n=\pi\omega_n^2$. For a pulsed laser beam, the energy per pulse is described as E and the fluence or the energy density is described as F. Thus, the fluence at any given point n along the laser beam 12 is $F_n=E/A_n$. The fluence threshold 15, or the required minimum energy density of the laser beam 12 for a particular dental treatment is $F_T$. For ablative treatments the treatment threshold is equal to the minimum energy density needed for ablation of dental tissue. In some embodiments, a subablative operation may be performed on the dental hard tissue in which the temperature of the surface of the enamel is increased by about 400° C., so as to remove carbonate therefrom. Carbonate removal may occur in enamel with a 9.3 µm laser having a fluence typically between 0.5-5 J/cm². Due to carbonate removal, the tooth can become more resistant to formation of caries. The fluence threshold 15 or $F_T$ is generally determined by the waist 14 diameter $2\omega_0$, a distance from the waist along the beam, the energy per pulse E, the absorption of the laser energy by the material being treated, and the treatment to be performed. The absorption of the laser energy is a function of the wavelength of the laser beam 12 and of the material being treated. For absorption of laser energy in dental hard tissue the wavelength range is generally from about 9 µm to about 12 µm, e.g., about 9.3 µm to about 9.6 µm.

In general, the farther the point n is from the waist 14, the larger $\omega_n$ will generally be. As $\omega_n$ increases, $F_n$ decreases. This occurs in both directions from the waist 14. Thus, on either side of the waist 14, typically there exists a point where $F_n=F_T$, with the beam diameter $2\omega_n$. As such, any further increase in the beam diameter may fail to treat dental tissue at the given energy per pulse of the laser beam 12. A depth of treatment 16 can thus be described as the distance between the two points, one on each side of the waist 14, at which the fluence is approximately equal to $F_T$. The depth of treatment 16 is typically centered around the waist 14.

Figure 2A:
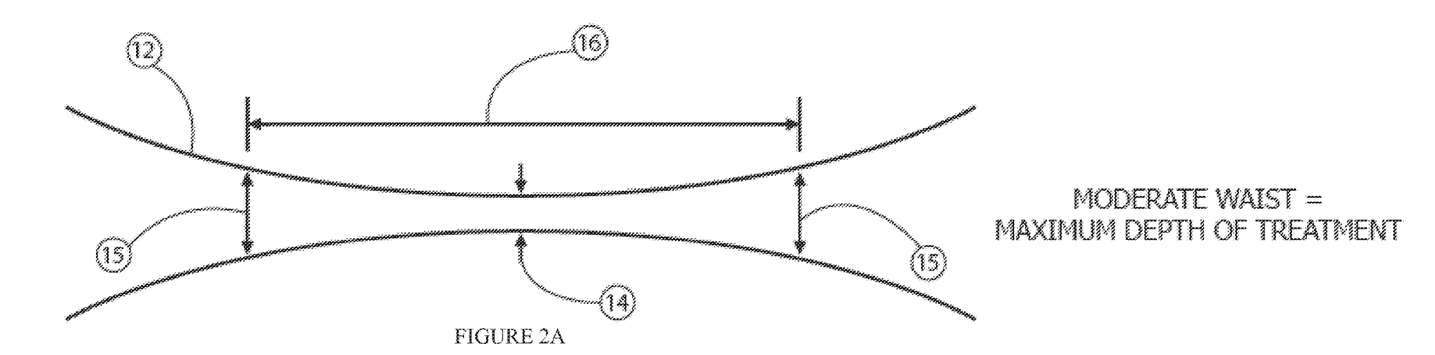
FIGS. 2A-2C depict three different laser waists and depth of treatment regions, according to various embodiments.
Figure 2B:
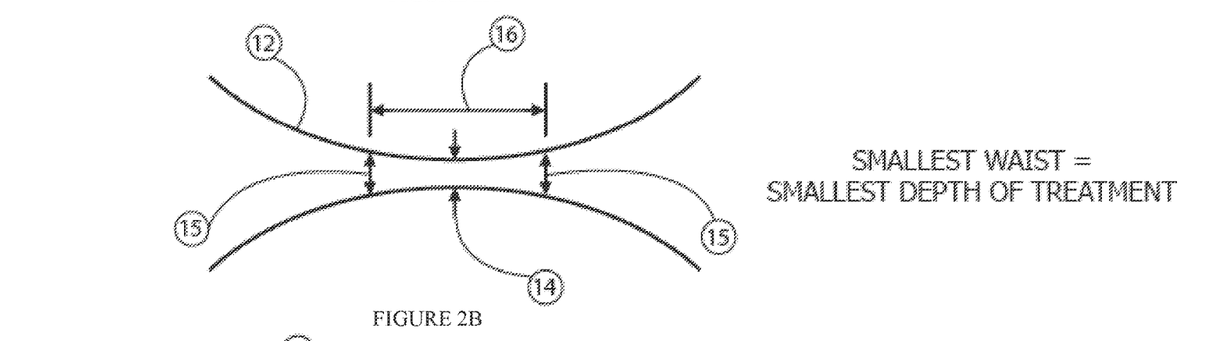
Figure 2C:
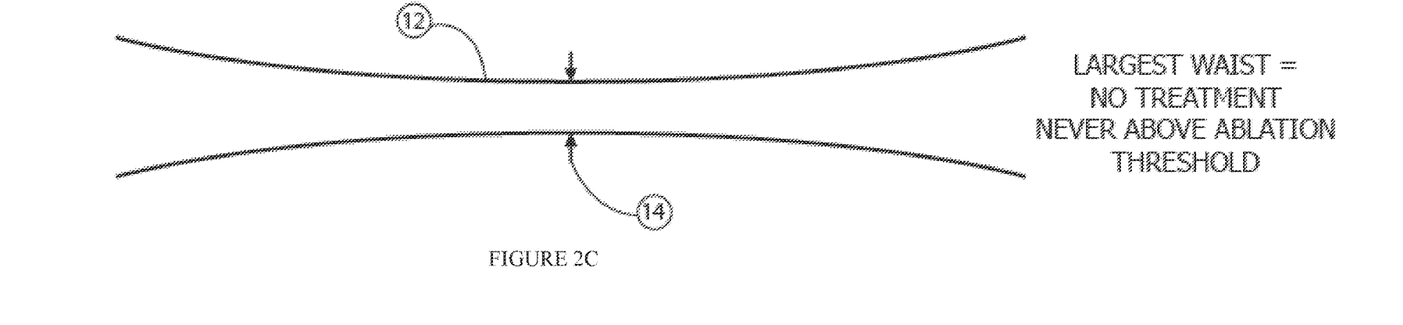

The size of the waist 14 can have a strong effect on the depth of treatment 16. With reference to FIGS. 2A-2C, for a given level of E, a moderate waist 14 (shown, e.g., in FIG. 2A) with a low beam taper can maximize the depth of treatment 16. A smaller waist 14 (shown, e.g., in FIG. 2B), although providing a higher F at the waist 14, in combination with a higher beam taper may result in a greater rate of increase in $\omega_n$ and, thus, may result in a smaller depth of treatment 16. A larger waist 14 (shown, e.g., in FIG. 2C), no matter how low the beam taper, generally yields an energy density below the fluence threshold 15 generally required for treatment of hard dental tissue. While the waist 14 is the minimum beam diameter, the actual beam diameter at the point of contact on the treatment surface is generally called the spot size. Spot sizes less than 50 µm typically can be formed with a relatively short a depth of treatment 16, while spot sizes larger than 1000 µm typically do not have enough fluence even at longer pulse widths.

Figure 3:
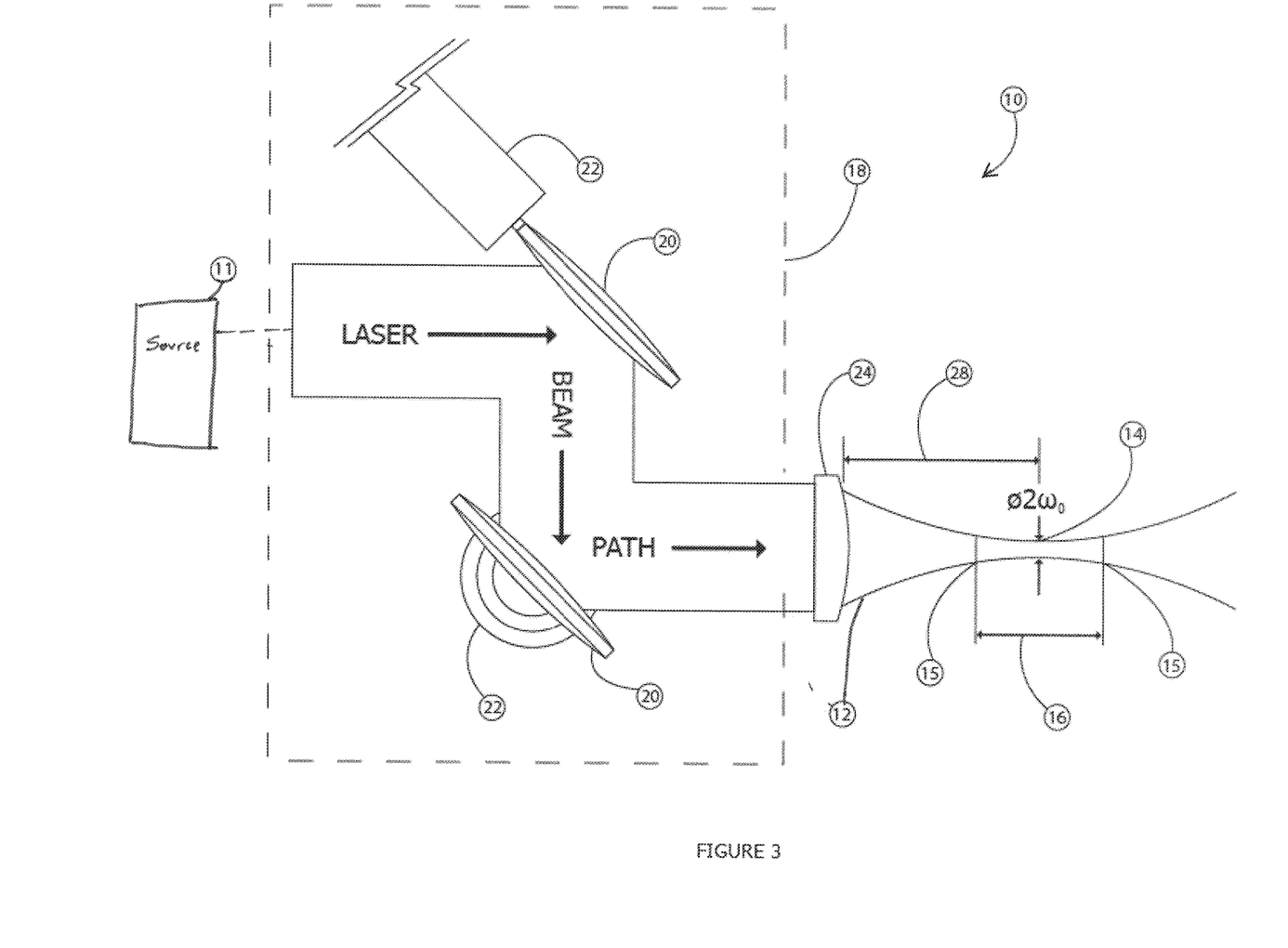
FIG. 3 is a depiction of a laser beam path and a resultant beam waist and depth of treatment, according to various embodiments.

With reference to FIG. 3, in various embodiments an example dental laser treatment system 10 includes a laser beam 12 provided by a laser source 11 that follows a path formed by a beam guidance system 18. In some embodiments, the beam guidance system 18 includes two galvanometer mirrors 20 driven by galvanometer actuators 22, and a focusing element 24. In various other embodiments, any other beam guidance devices, e.g., optical fibers, waveguides, etc. can be used. Generally, one or more lenses form at least one focusing element 24. The laser source 11 generally outputs the laser beam that is subsequently transmitted through an articulated arm, one or more fiber optic cables, a combination of an articulated arm and one or more fiber optic cables, or any other devices for transmitting a laser beam over a distance.

The distance from the focusing element 24 to the waist 14 is referred to as the focal distance 28. In some embodiments, the focusing element 24 is located between the beam guidance system 18 and the waist 14, and the beam guidance system 18 may be located between the laser source and the focusing element 24. The laser source 11 and/or the focusing element 24 are configured such that a waist 14 having a diameter in the range from about 50 µm up to about 500 µm can be formed. In various instances, the waist 14 diameter may be, e.g., 50 µm, 75 µm, 100 µm, 150 µm, 200 µm, 250 µm, 300 µm, 350 µm, 400 µm, 450 µm, 500 µm, etc. In order to have a low enough beam taper so as to provide a suitable depth of treatment 16 of about 5 mm or more, the focal distance 28 in some embodiments is at least about 25 mm. For example, the focal distance 28 may be, e.g., 25 mm, 35 mm, 45 mm, 55 mm, 65 mm, 75 mm, 85 mm, 95 mm, 105 mm, 120 mm, 135 mm, 150 mm, 165 mm, 175 mm, 185 mm, 200 mm, etc. With a proper selection of focal distance 28, waist 14 diameter, laser wavelength, and energy per pulse, a depth of treatment 16 of at least about 5 mm, 10 mm, 15 mm, 20 mm, 25 mm, 30 mm, 35 mm, 40 mm, 45 mm, or even 50 mm can be achieved. In some instances, as shown for example in the embodiment of FIG. 3, the focal distance 28 and the depth of treatment 16 are approximately equal.

Figure 4:
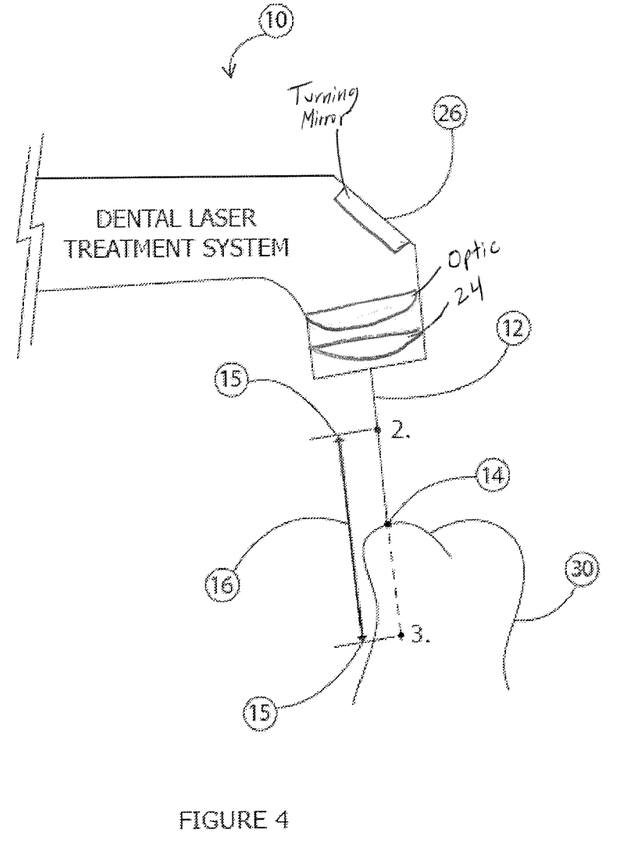
FIG. 4 depicts a portion of a laser beam handpiece/main chamber assembly and a depth of treatment, according to various embodiments.

With reference to FIG. 4, in some embodiments a handpiece/main chamber assembly 26 is configured for directing the laser beam 12 to treat a hard tissue, e.g., portion of a tooth 30. The handpiece portion of the handpiece/main chamber assembly 26 is disposed downstream from the focusing element 24 (which is located within the main chamber). Optionally, the handpiece/main chamber assembly 26 may contain a turning mirror (not shown) that is disposed downstream from the focusing element 24 and that guides the laser beam 12 at an angle to the main axis of the handpiece/main chamber assembly 26 in order to improve ergonomics. In some embodiments, the focusing element 24 is located within the handpiece.

When the example handpiece/main chamber assembly 26 is used, the focal distance 28 in one embodiment may be approximately 135 mm. At a wavelength of about 9.3 µm and with a size of the beam incident upon the focusing element 24 of about 7 mm in diameter this focal distance can produce a waist of about 250 µm. High fluence and a long focal distance 28 aid in providing a relatively large depth of treatment 16. One benefit of a large depth of treatment is the lack of need for any mechanical distance regulator between the laser system (generally the handpiece/main chamber assembly) and the dental tissue being treated. Conventional distance regulation devices may include gauges, scales, spacers, standoff devices, or any other means for regulating a distance between the dental laser treatment system and the dental surface to be treated. With a sufficiently large depth of treatment, laser dental treatment may be performed without any distance regulation, since the laser beam energy density remains at or above the fluence threshold despite the distance variations expected in using a manually controlled tool (e.g., caused by movements of a dentist's hand and/or patient's head/mouth).

Many laser-based treatment systems are configured to minimize wasted laser energy which, if not used for treatment, can cause damage to tissue portions that are not to be treated. To this end, various systems are configured such that laser-based ablation and/or other treatment occurs at a region where the laser beam is focused, e.g., at the waist of the laser beam. The focal region can be at a tissue surface or below the tissue surface, but the laser beam is generally targeted such that the desired treatment occurs at or very close to the focal region. Thus, if the focal region is at the tissue surface, the treatment generally occurs at the tissue surface. If the focal region is below the tissue surface, the treatment may occur beneath the tissue surface. Such systems are often described as "optically fast" systems.

In "optically fast" systems, a focusing optic having a relatively short focal length (e.g., 5 mm, 10 mm, 12 mm, 15 mm, etc.), is used to taper a laser beam over a relatively short beam-propagation distance so as to concentrate the energy thereof within the focal region. If an operator intentionally or inadvertently moves the beam-directing instrument, such as a handpiece, in a Z direction (i.e., a direction normal to tissue surface and along the beam), the tissue portion to be treated may no longer be at the focal region. As such, the tolerance of such systems in the Z direction is generally low, e.g., 1 mm, 0.5 mm, or even less. The standoff between the tip of the beam-directing instrument and the tissue surface is also relatively low, e.g., 2 mm, 5 mm, etc. Due to the short standoff, a slight movement of the beam-directing instrument, whether intentional or inadvertent, may cause the laser beam spot to move a relatively small distance in the X and/or Y directions along the tissue surface.

Figure 5:
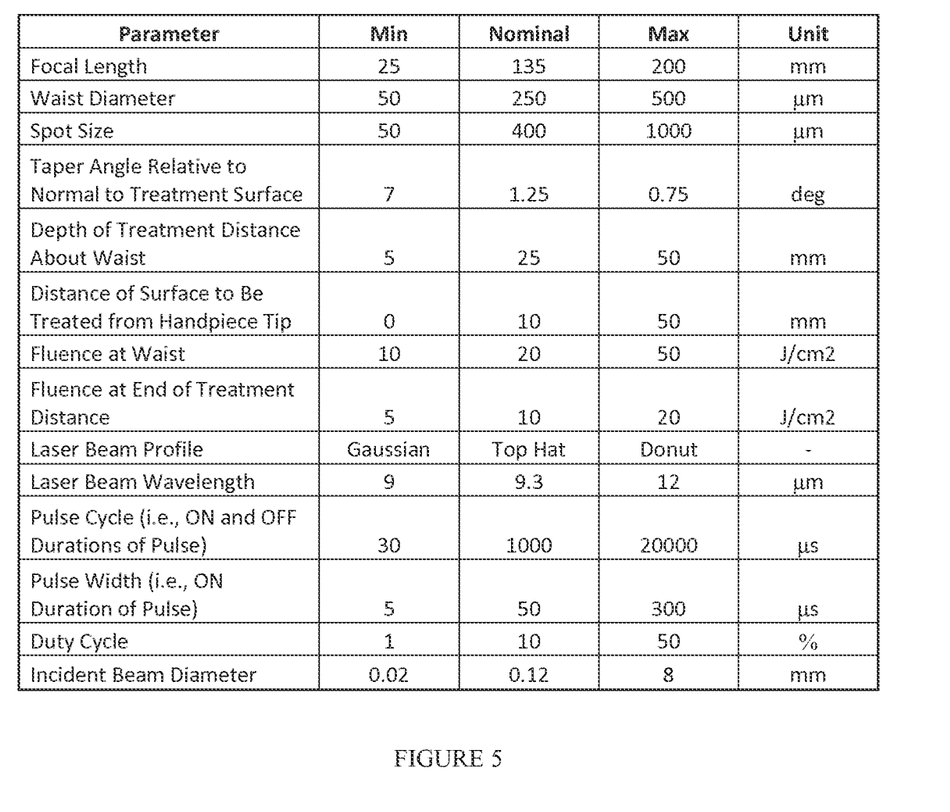
FIG. 5 is a chart showing example minimum, maximum, and nominal operating parameters of a laser system, according to various embodiments.

Unlike conventional "optically-fast" systems, various embodiments described herein feature optical subsystems that can be described as "optically slow" systems. FIG. 5 is a chart showing example minimum, maximum, and nominal values for various parameters of an example laser system described herein. Such "optically slow" systems include a focusing optic having a relatively long focal length, e.g., greater than about 25 mm and up to about 200 mm, e.g., 25 mm, 35 mm, 45 mm, 55 mm, 65 mm, 75 mm, 85 mm, 95 mm, 105 mm, 120 mm, 135 mm, 150 mm, 165 mm, 175 mm, 185 mm, 200 mm, etc., each limit having a tolerance of, e.g., 0.5%, 1%, 2%, 5%, 10%, 20%, etc. The standoff between the tip of the beam-directing instrument and the tissue surface may be, e.g., 0.1 mm, 1 mm, 5 mm, 10 mm, 15 mm, 20 mm, 30 mm, 40 mm, 50 mm, etc. In instances in which the standoff is relatively large, a small angular movement of the instrument that can cause the laser-beam spot to move in X and/or Y directions along the tissue surface can cause a relatively large movement of the beam spot, e.g., by 0.2 mm, 0.5 mm, 1 mm, or more. To minimize the risk that the laser beam is directed to a portion of the tissue not to be treated due to such X and/or Y direction movement, various embodiments of this disclosure include an automated, feedback-controlled beam-guidance system for scanning a region of the tissue to be treated. The operator thus need not manually move the beam-directing instrument to move the beam in the X and/or Y directions.

Moreover, in various embodiments, the focus element 24 can taper a laser beam over a relatively long propagation distance so as to concentrate the energy thereof within the focal region. In various embodiments, the taper angle relative to a normal to the tissue surface may be, e.g., 0.5°, 0.75°, 1°, 1.25°, 1.75°, 2°, 5°, 7°, 10°, etc. Due to this, the depth of treatment 16 (e.g., a distance in a Z direction about the beam waist 14 at which the fluence is effective for treatment (e.g., ablation, removal of carbonate, etc.) may be, e.g., 5 mm, 10 mm, 15 mm, 20 mm, 25 mm, 30 mm, 35 mm, 40 mm, 45 mm, 50 mm, etc., with a tolerance of, e.g., 0.5%, 1%, 5%, 10%, 20%, etc. In such systems, the fluence at the waist 14 may be, e.g., 10 J/cm$^2$, 12 J/cm$^2$, 15 J/cm$^2$, 20 J/cm$^2$, 25 J/cm$^2$, 30 J/cm$^2$, 40 J/cm$^2$, 50 J/cm$^2$, etc. The fluence at the extremes of the depth of treatment 16 ($F_T$) may be, e.g., 5 J/cm$^2$, 7 J/cm$^2$, 10 J/cm$^2$, 12 J/cm$^2$, 15 J/cm$^2$, 17 J/cm$^2$, 20 J/cm$^2$, etc. Therefore, various embodiments allow for a greater tolerance of about 5 mm up to about 15 mm in the movement of the beam-directing instrument in the Z direction, whether such movement is inadvertent or intentional. In various instances, the spot size generated by such systems may be, e.g., 50 µm, 75 µm, 100 µm, 150 µm, 200 µm, 250 µm, 300 µm, 350 µm, 400 µm, 450 µm, 500 µm, 600 µm, 700 µm, 800 µm, 900 µm, 1000 µm, etc.

In general, the diameter of the laser beam that is incident upon a focusing element also affects the diameter of the waist (the spot size at the focal distance from the focusing element). The relationship between the diameter of the incident beam and the waist diameter is generally given by:

$$\text{waist diameter} = 1.27 * f * \text{wavelength} * \frac{M^2}{D}$$

where f is the focal length of the beam-focusing element, M is a constant associated with the beam profile (such as Gaussian, top hat, etc.), and D is the diameter of the incident beam. Thus, for a laser having a certain wavelength (e.g., 9.3 µm, 9.6 µm, etc.) and a beam profile, a beam having a suitable waist diameter can be formed by controlling the focal length f of the focusing element and/or diameter D of the incident beam. For a specified focal length f, the waist diameter (also called the waist) is inversely proportional to the incident-beam diameter D.

In various embodiments, the waist diameter is selected such that the fluence per pulse at the waist and at any cross-section of the laser beam within the depth of treatment is adequate for the selected treatment such as ablation of dental hard tissue, a subablative treatment such as removal of carbonate from enamel, etc. To this end, in some embodiments, initially the wavelength of the laser, the beam profile, and focal length f of the focusing element are selected. In order to provide a waist diameter within a suitable range, e.g., from about 50 µm up to about 500 µm, the laser is configured to transmit to the focusing element a laser beam having a suitable diameter. If such a beam is not provided, the selected waist diameters and spot sizes within the depth of treatment may not be achieved.

To illustrate, if a focusing element having a focal length of 25 mm is used, to achieve a waist diameter of 50 µm, the laser is configured to provide a beam having a diameter of about 0.6 mm. To achieve waist diameters of 250 µm and 500 µm, however, the laser is configured to provide beams having diameters of about 0.6 mm and 0.06 mm, respectively. If a focusing element having a focal length of 200 mm is used instead, to achieve a waist diameter of 50 µm, the laser is configured to provide a beam having a diameter of about 5 mm. To achieve waist diameters of 250 µm and 500 µm, the laser is configured to provide beams having diameters of about 0.95 mm and 0.48 mm, respectively.

In general, if a laser beam having a specified diameter is incident upon a focusing element having a short focus (e.g., less than 25 mm), the waist diameter, which is directly proportional to the focal length, would be relatively small compared to a waist diameter obtained if the same laser beam is directed to a focusing element having a longer focal length (e.g., about 25 mm or more). As such, the taper angle of the beam output from a focusing element having a longer focus would be less than the taper angle produced by a focusing element having a shorter focus. As described above, the smaller taper angle can result in an optically slow system having a relatively greater depth of treatment than an optically fast system. The values of focal length and waist or waist diameter described herein are within a tolerance of, e.g., 0.05%, 0.1%, 1%, 2%, 5%, 10%, 20%, etc.

Figure 6:
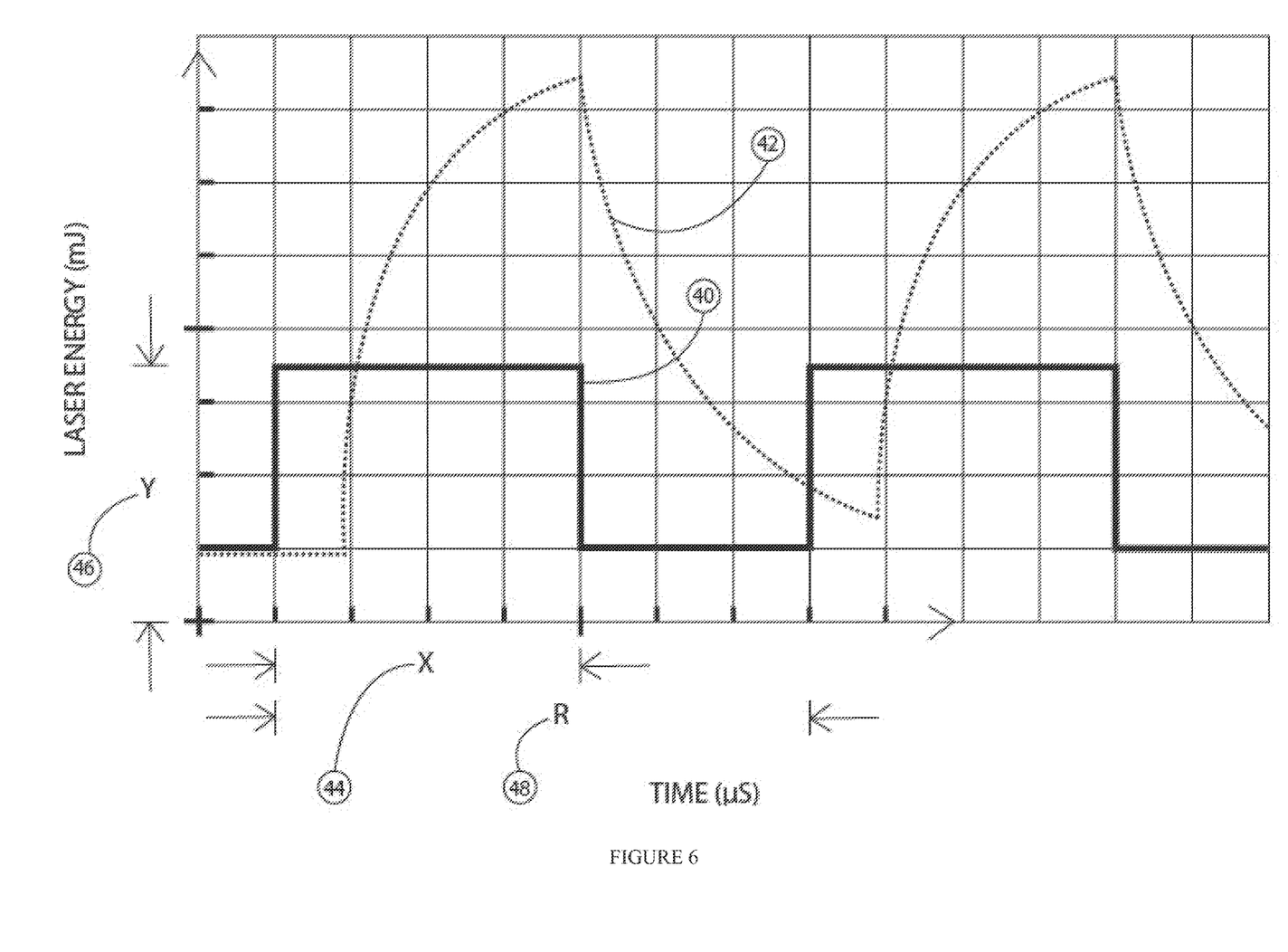
FIG. 6 is a schematic graph showing an example laser pulse train including both a signal pulse and a laser pulse, according to various embodiments.

FIG. 6 shows an example pulse train according to various embodiments, which includes both a signal pulse 40 and a laser pulse 42 (e.g., a $CO_2$ laser pulse). The signal pulse 40 may be a TTY trigger signal. The laser pulse 42 can have shape similar to that of a shark fin and has an ignition delay after the start of the signal pulse. The pulse width (X) 44 and pulse height (Y) 46 of the trigger signal are shown, and may be used to describe the laser pulse. One pulse cycle (R) 48 is also shown, the duration of which together with the pulse ON duration 44 can describe a distance/spacing between two consecutive pulses. Unless operated in a continuous wave mode, a pulse cycle includes ON and OFF durations. The number of pulse cycles 48 in one second represents the pulse repetition rate. In various instances, the pulse ON duration 44 may be, e.g., 5 µs, 10 µs, 15 µs, 20 µs, 25 µs, 30 µs, 40 µs, 50 µs, 60 µs, 70 µs, 80 µs, 90 µs, 100 µs, 125 µs, 150 µs, 175 µs, 200 µs, 250 µs, 300 µs, etc. In various instances, the pulse cycle period may be, e.g., 30 µs, 40 µs, 50 µs, 100 µs, 200 µs, 300 µs, 500 µs, 750 µs, 1000 µs, 2000 µs, 5000 µs, 10,000 µs, 15,000 µs, 20,000 µs, etc. In various instances, the duty cycle (described as a ratio of pulse ON duration to pulse cycle period) may be, e.g., 1%, 5%, 10%, 20%, 30%, 40%, 50%, etc.

In some embodiments, pulsed lasers emit laser optical energy in bursts of photons. The bursts of photons, or pulses, can be structured into a pulse train. The pulses are typically described in terms of by pulse width, pulse height, and/or pulse energy. The pulse width can represent the pulse ON duration or the pulse cycle period. The pulse train is typically described in terms of the repetition rate or pulse frequency, i.e., a frequency of the bursts of photons. Only certain pulse trains, described by the pulse width, height, and repetition rate, can cut dental tissue, especially dental hard tissue, safely and effectively. Dental hard tissue may include oral osseous tissue as well as the tissue of teeth. The need to have enough energy to exceed the dental tissue's ablation threshold, and not too much energy so as to avoid adverse surface thermal modification, limits the possible combinations of useful laser parameters including pulse and pulse-train parameters. The combination of useful laser parameters are sets of laser parameters that, when used in combination, can result in safe and effective treatment of dental tissue. The laser parameters include pulse shape, pulse width, pulse height, and/or repetition rate. The pulse width and height affect the amount of energy per pulse, and the repetition rate affects the amount of power delivered over time. Additionally, the dental tissue may be cooled to allow for greater pulse energies to be used that, without cooling, may cause thermal shock and may damage the dental tissue. The use of cooling can thus increase the energy that may be safely and effectively directed to the dental tissue per pulse.

Variation of the pulse shape parameters can result in changes in the pulse energy. Variation of the repetition rate can result in changes in laser power. The energy per pulse typically affects surface characteristics and can result in cracking or asperities when the energy per pulse is too great. Asperities may be formed by the melting of enamel and/or dentin and the associated mineral modification from a ceramic transitioning to a salt phase. The power delivered over time to the tooth, when too great, may result in pulpal heating. If the temperature of the pulp of the tooth increased by about 5° C. there is a chance that the pulp will be damaged and that the tooth may be damaged permanently. In general, the dental tissue is insulating, however, and usually limits the temperature increase in the pulp, even when the tooth surface temperatures are relatively high. Additionally, cooling the tooth surface may reduce the amount of heat conducted into the tooth and may further limit any increase in the pulp temperature.

These thermal insulating properties are generally dependent upon the thickness of the tooth between the tooth's surface and its pulp chamber. Therefore, as the tooth surface is worn or removed, the tooth's thermal insulating properties generally have a reduced effect. Pulse energies therefore typically have to be decreased as the tooth tissue thickness to the pulpal chamber decreases. A reduction of tooth thickness, often resulting from wear, erosion, clinical removal, etc., can change the pulse shapes and repetition rates that may be used safely and effectively. As such, in various embodiments, an objective of avoiding undesirable surface modifications and excessive heating of the pulp of the tooth can determine a group of pulse shapes and repetition rates that are safe and practical, or a combination of useful laser parameters. The range of safe and effective laser pulse shapes and repetition rates can be broadened by cooling of the tooth surface and by the insulating properties of teeth.

Figure 7:
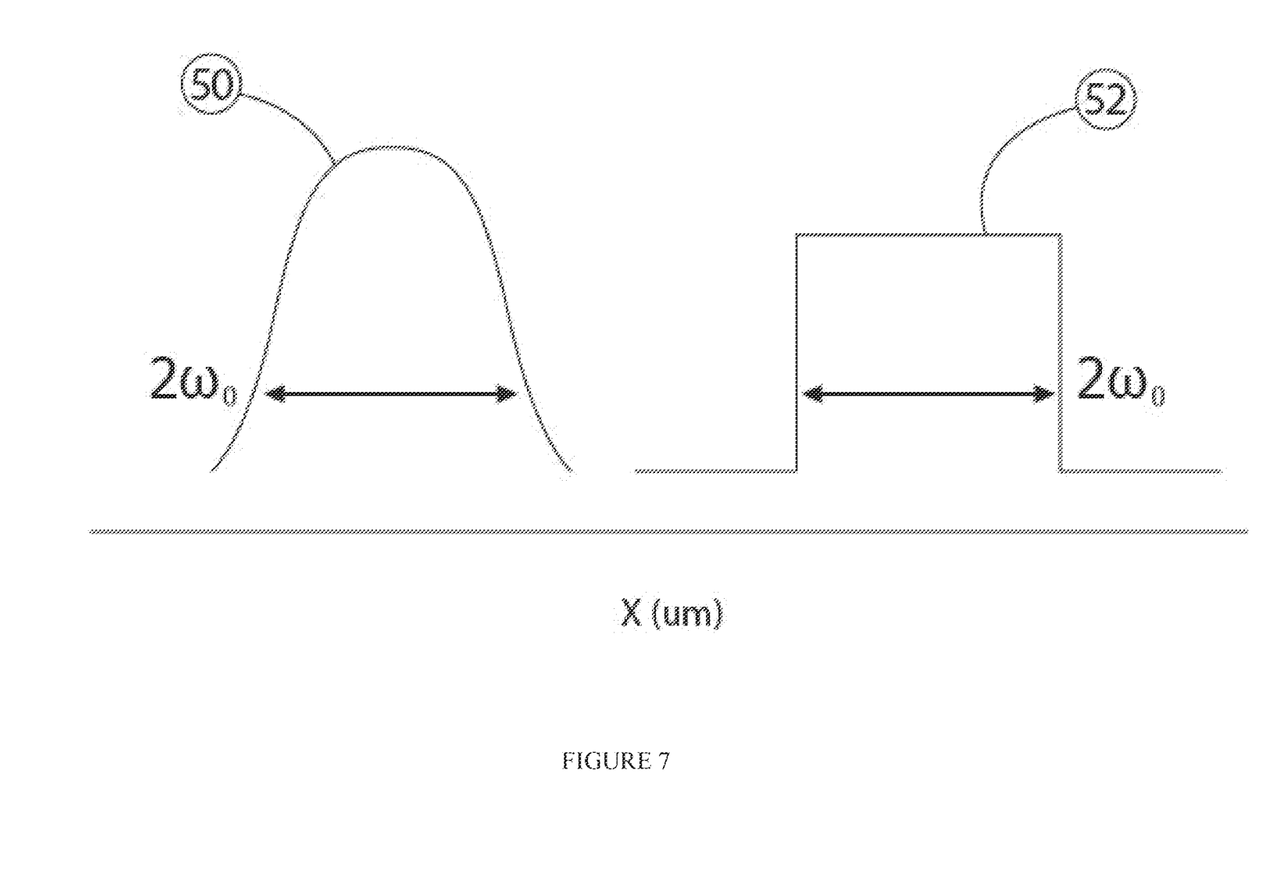
FIG. 7 depicts a Gaussian beam profile and a top-hat beam profile that may be used for treatment, according to various embodiments.

With reference to FIG. 7, two different example beam profiles in a single laser axis, X, are shown. The laser beam propagates in a direction normal to the X axis. A Gaussian beam profile 50 has a bell shaped beam profile. A top-hat beam profile 52 is shaped like a square wave. A waist may be defined by a number of standard techniques including: D4σ, 10/90 or 20/80 knife-edge, 1/e2, full width half maximum (FWHM), and D86. A person of ordinary skill in the art understands the definition and use of these techniques and, as such, use of these techniques is within the scope of various embodiments of this disclosure. The Gaussian beam profile 50 can provide maximum energy at the center of the waist. A near-Gaussian beam profile closely resembles a Gaussian beam profile without being purely Gaussian in shape. The Gaussian beam profile or near-Gaussian beam profiles are typically generated using standard spherical optics and lasers. The top-hat beam profile can be generated using diffractive optics. Diffractive optics for producing a top-hat beam profile are typically designed for each specific application. Near-top-hat beam profiles may be generated using beam homogenizers and lenses. The top-hat beam profile 52 can uniformly provide energy throughout the waist. This may allow the top-hat and near-top-hat beam profiles to be well suited for treatments that do not require a threshold fluence that can only be obtained using a Gaussian or near-Gaussian profile, but can benefit from a substantially even fluence throughout the beam spot. Unlike typical ablative treatments, some laser treatments require that the fluence be within a treatment fluence range, a lower bound of which is greater than (or at least equal to) a lower treatment threshold, and an upper bound of which is smaller than (or at most equal to) a higher treatment threshold. The top-hat beam profile may be used for these treatments to ensure that energy directed to a region of dental tissue is within a selected treatment fluence range. In other embodiments, other beam profiles known in the art may be used (e.g., a donut beam profile).

Figure 8:
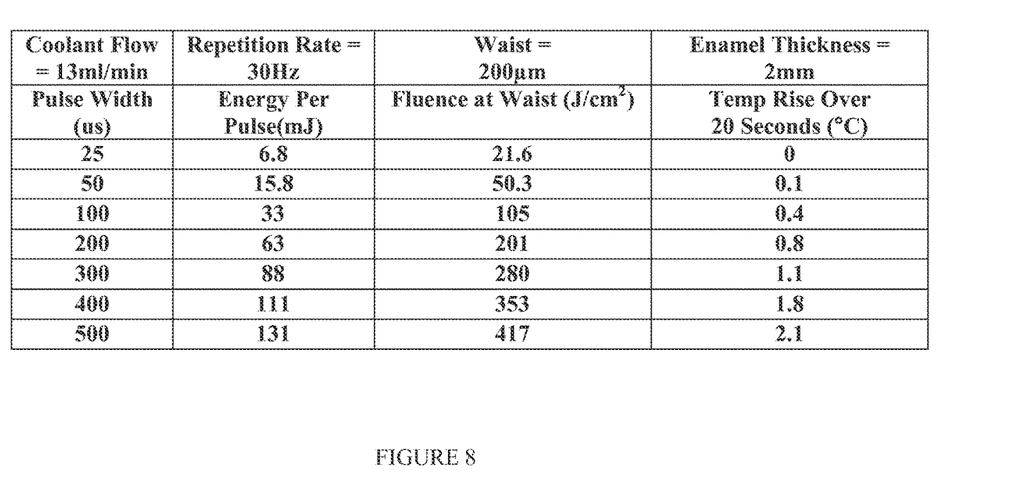
FIG. 8 is a chart showing example values of laser pulse width, energy per pulse, and corresponding temperature rises in hard dental tissue, according to various embodiments.

FIG. 8 shows example effects of laser pulse width and energy per pulse on the temperature of dental hard tissue (e.g., enamel). Pulse durations greater than 50 µs are longer than those typically used for ablative treatment using 9.3 µm or 9.6 µm lasers. In some instances, pulse durations significantly greater than the thermal relaxation time of the dental hard tissue can result in heat accumulation, which can damage the pulp of the tooth. These longer pulse durations can also result in poor surface morphology, cracking, and/or asperities. By employing cooling of the dental tissue, however, heat buildup and surface damage can be avoided or at least mitigated, and longer pulse durations can be safely used. For cooling dental tissue, fluid can be delivered to the dental tissue to be treated, and a handpiece/main chamber assembly may provide a subsystem for delivering the fluid/coolant. U.S. Patent Application No. 2013/0323675, describes examples of such cooling systems and methods and is incorporated herein by reference in its entirety. In some instances, the coolant fluid is water or a water mist. Pulse durations that are greater than 50 µs can, in some cases, provide greater energy per pulse (E), and thus allow for a greater depth of treatment 16.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and operational functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A dental laser treatment system comprising:
    a $CO_2$ laser source for providing a laser beam having:
        an energy per pulse between 0.20 mJ and 9.8 mJ;
        a wavelength in a range from 9 µm to 12 µm; and
        an incident beam diameter in a range from 0.02 mm to 8 mm; and
    a subsystem focusing element onto which the laser beam having the incident beam diameter is directed, the subsystem focusing element structured and arranged:
        to provide a focal length in a range from 25 mm to 200 mm; and
        to taper the incident laser beam:
            (i) to form a waist having a diameter smaller than the incident beam diameter in a range from 50 µm to 250 µm; and
            (ii) to provide a fluence in a range from 5 $J/cm^2$ to 10 $J/cm^2$ at a distance between 5 mm and 50 mm centered about the waist.

2. The dental laser treatment system of claim 1, wherein the laser beam comprises a Gaussian beam profile.

3. The dental laser treatment system of claim 1, wherein the laser beam comprises a top-hat beam profile.

4. The dental laser treatment system of claim 1, wherein the focal length is 135 mm.

5. The dental laser treatment system of claim 1, further comprising:
   a beam guidance system, the beam guidance system being located between the laser source and the focusing element.

6. The dental laser treatment system of claim 5, wherein the beam guidance system comprises at least one galvanometer.

7. The dental laser system of claim 1, further comprising a handpiece assembly.

8. The dental laser system of claim 1, wherein the incident beam diameter is based at least in part on the waist and the focal length of the focusing element, the incident beam diameter being within a range from 0.06 mm up to 5 mm.

9. The dental laser system of claim 1, wherein the focusing element comprises at least one lens.

10. The dental laser system of claim 1 further comprising a system for cooling material within the treatment distance below the waist.

11. The dental laser system of claim 10, wherein the system for cooling material is adapted to deliver fluid within the treatment distance below the waist.

12. A method for performing a laser dental treatment, the method comprising the steps of:
   providing a laser beam from a $CO_2$ laser source having:
      an energy per pulse between 0.20 mJ and 9.8 mJ;
      a wavelength in a range from 9 μm to 12 μm; and
      an incident beam diameter in a range from 0.02 mm to 8 mm; and
   tapering the laser beam using a subsystem focusing element onto which the laser beam having the incident beam diameter is directed, the subsystem focusing element structured and arranged to provide a focal length in a range from 25 mm to 200 mm, such that the incident laser beam:
      (i) forms a waist having a diameter smaller than the incident beam diameter in a range from 50 μm to 250 μm; and
      (ii) provides a fluence in a range from 5 $J/cm^2$ to 10 $J/cm^2$ at a distance between 5 mm and 50 mm centered about the waist.

13. The method of claim 12, wherein the laser beam has a Gaussian beam profile.

14. The method of claim 12, wherein the laser beam has a top-hat beam profile.

15. The method of claim 12, wherein the focal length is 135 mm.

16. The method of claim 12, further comprising turning the laser beam.

17. The method of claim 12, wherein the focusing element comprises at least one lens.

18. The method of claim 12, wherein providing the laser beam from the laser source comprises adjusting the incident beam diameter based at least in part on the waist and the focal length of the focusing element, the incident beam diameter being within a range from 0.06 mm up to 5 mm.

* * * * *